Aug. 26, 1930.  B. A. ROBINSON  1,773,861
OIL PRESSURE CLUTCH
Filed April 9, 1928  2 Sheets-Sheet 1
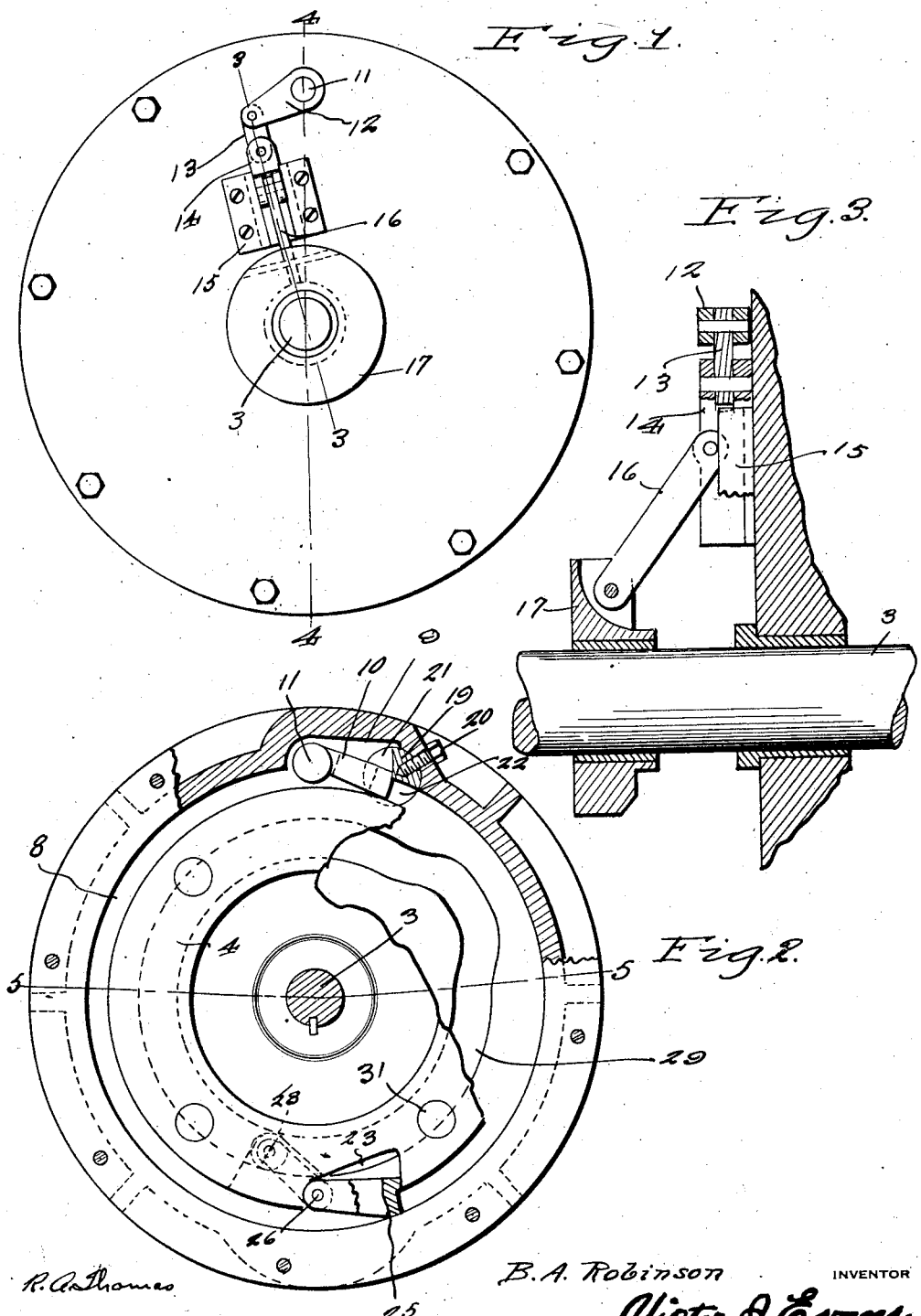

Aug. 26, 1930.     B. A. ROBINSON     1,773,861
OIL PRESSURE CLUTCH
Filed April 9, 1928     2 Sheets-Sheet 2
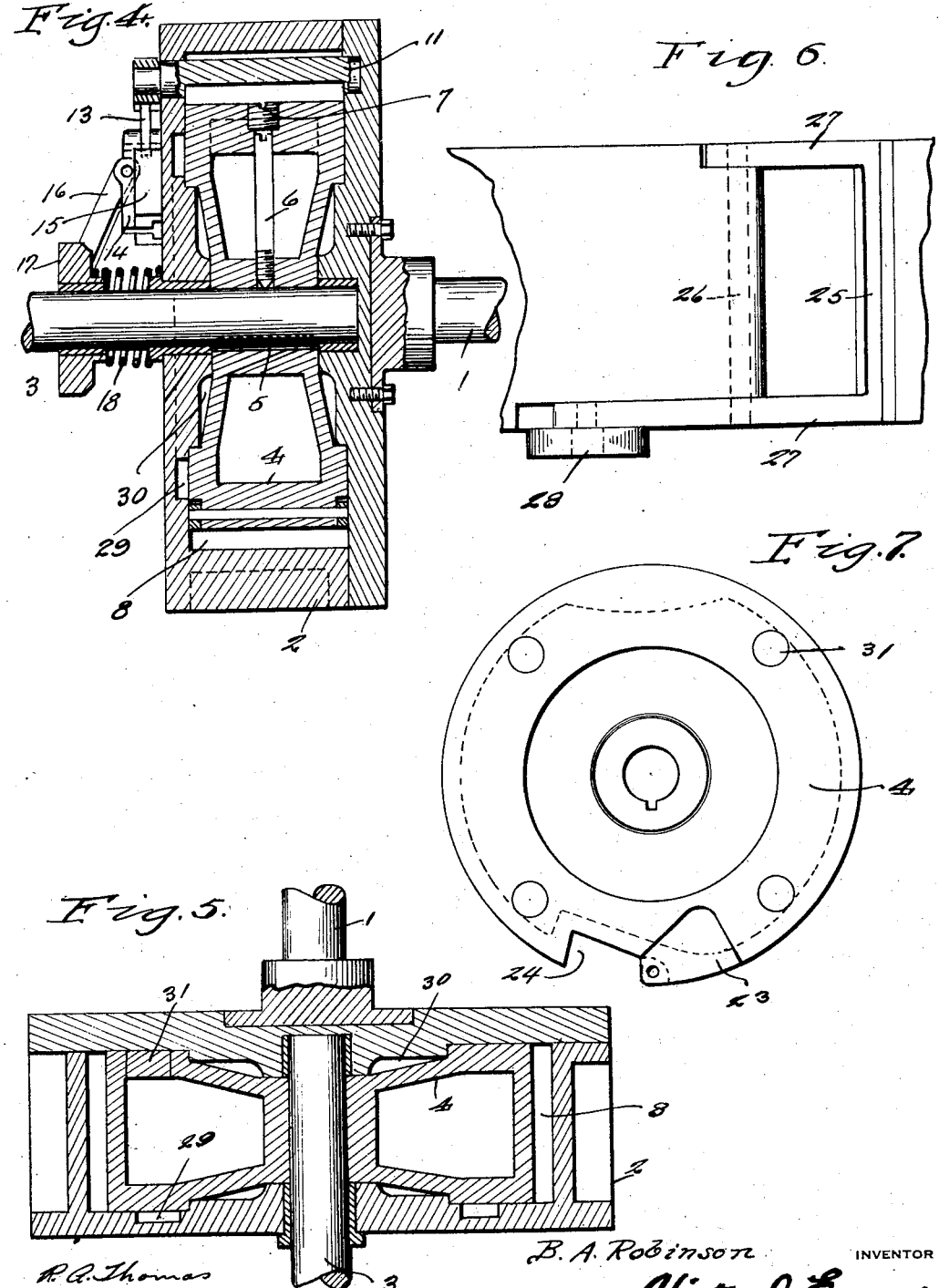

Patented Aug. 26, 1930

1,773,861

UNITED STATES PATENT OFFICE

BURTON A. ROBINSON, OF DETROIT, MICHIGAN

OIL-PRESSURE CLUTCH

Application filed April 9, 1928. Serial No. 268,590.

This invention relates to a fluid clutch, the general object of the invention being to provide a casing and a rotor therein spaced from the casing to form an annular oil chamber, with a gate valve carried by each part, the valve of the drive part acting to place the liquid in the annular chamber under pressure with the valve on the other or driven part over an abutment against which the pressure acts so that the driven part will be rotated.

Another object of the invention is to provide means for adjusting the valve of the drive part so as to regulate the pressure of the liquid or fluid to enable the driven part to be rotated at different speeds.

A still further object of the invention is to provide means for moving the valve of the driven part into a recess formed in said part when the valve of the drive part approaches the valve of the driven part so that the valves can readily pass each other.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the device.

Figure 2 is a view of the opposite side, with parts broken away.

Figure 3 is a section on line 3—3 of Figure 1.

Figure 4 is a section on line 4—4 of Figure 1.

Figure 5 is a section on line 5—5 of Figure 2.

Figure 6 is a view showing how the valve or abutment member of the rotor is hingedly attached thereto, this view also showing the cam groove engaging roller of said valve.

Figure 7 is a side view of the rotor.

In these views, the numeral 1 indicates the drive shaft to which is attached the circular casing 2 and the numeral 3 indicates the driven shaft which has one end journaled in the casing and to which the rotor 4 is keyed, as shown at 5. The rotor is also attached to the shaft 3 by means of the screw bolt 6 which is inserted into holes formed in the hub and periphery of the rotor, the bolt being threaded in the hole in the hub with its pointed end engaging the shaft 3. The hole in the periphery is enlarged at its outer end and threaded to receive a plug 7. As shown, the rotor is of less diameter than the interior diameter of the casing so that an annular chamber 8 is formed between the casing and rotor which is filled with oil or other liquid.

A recess 9 is formed in the inner wall of the casing and a gate valve 10 is adjustably arranged in the recess with its shaft 11 journaled in the ends of the casing, with one end extending from the casing. An arm 12 is fastened to said projecting end and the outer end of the arm is connected by a link 13 with a slide 14 mounted in the guideway 15 fastened to one side of the casing. A link 16 connects the slide with a collar 17 slidably mounted on the shaft 3 and normally held in spaced relation with the casing by a coil spring 18 encircling the shaft and bearing against the collar and a part of the casing. This spring normally holds the parts in a position with the free end of the member 10 bearing against the rotor and thus closing the chamber 8 at this point.

I provide a removable seat for the free end of the member 10 which consists of a plug 19 of circular shape in cross section and held in an opening in the casing through means of the bolts 20. This plug is provided with a cut-away portion 21 forming a recess in which the free end of the member 10 operates and with a second cut-away portion 22 which coincides with the chamber 8.

The rotor is provided with the adjoining recesses 23 and 24, the recess 23 receiving the valve or abutment 25 which is pivoted to the rotor by means of the pin 26 passing through the arms 27 of the member 25, one arm of the member being extended and carrying a roller 28 which engages a cam groove 29 formed in the inner face of one of the ends of the casing. The high part of this groove is so situated that when the roller engages the same, the member 25 will be moved into the recess 23 when that part of the rotor carrying the valve or member 25 approaches the part of the casing carrying the valve 10 so that the valves can pass each other without the valve 25 moving the valve 10.

A chamber 30 is formed between the central part of the rotor and the casing, which acts as a reservoir for a reserve supply of oil and this oil will be caused to enter the chamber 8 under the action of centrifugal force and thus keep said chamber 8 full while the device is in operation. The oil passes from the chamber 30 to the chamber 8 between the rotor and the side walls of the casing.

From the foregoing it will be seen that when the casing is revolving, the member 10 will place the fluid in that part of the chamber between itself and the member 25 under pressure and this pressure, acting against the member 25, will cause the rotor to revolve and the speed of the rotor in relation to that of the casing can be regulated by adjusting the member 10 through means of the collar 17. For instance, if the member 10 is resting upon the rotor, no liquid can pass said member 10 and thus the rotor will be revolved at the same speed as the casing, but if said member 10 is slightly raised from the rotor, some of the fluid can pass between the member 10 and the rotor so that the fluid between the members 10 and 25 will be under less pressure and therefore the rotor will revolve at less speed than the casing. Thus by adjusting the member 10, the rotor and the shaft 3 can be revolved from the shaft 1 and the casing at different speeds.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A fluid clutch comprising a casing, a rotor therein of smaller diameter than the interior diameter of the casing and forming an annular chamber between itself and the casing, said chamber containing fluid, the casing having a recess therein in communication with the chamber, an adjustable member in the recess and having a part entering the chamber for placing the liquid therein under pressure when the casing revolves, an abutment member carried by the rotor and extending into the chamber for receiving the pressure exerted by the fluid to cause the rotor to revolve with the casing, said rotor having two adjoining recesses therein in one of which the abutment member is pivoted, an arm on said member extending into the other recess, a roller on the arm, the casing having a cam groove therein in which the roller operates to move the abutment member into and out of the chamber and means for adjusting the adjustable member for increasing or decreasing the pressure exerted thereby upon the fluid.

In testimony whereof I affix my signature.
BURTON A. ROBINSON.